(12) United States Patent
Ritter et al.

(10) Patent No.: US 8,726,621 B2
(45) Date of Patent: May 20, 2014

(54) AGRICULTURAL HARVESTING HEAD SENSOR ARRANGEMENT

(75) Inventors: Aaron S. Ritter, Milan, IL (US); Douglas J. Bollin, Port Byron, IL (US)

(73) Assignee: Deere & Company, Moline, IL (US)

(*) Notice: Subject to any disclaimer, the term of this patent is extended or adjusted under 35 U.S.C. 154(b) by 65 days.

(21) Appl. No.: 13/284,926

(22) Filed: Oct. 30, 2011

(65) Prior Publication Data

US 2013/0104508 A1 May 2, 2013

(51) Int. Cl.
*A01D 41/14* (2006.01)
*A01D 46/08* (2006.01)
*A01D 75/28* (2006.01)

(52) U.S. Cl.
USPC ..................................................... 56/10.2 E

(58) Field of Classification Search
USPC ....... 56/10.2 E, 10.9, 15.2, DIG. 10, DIG. 15
See application file for complete search history.

(56) References Cited

U.S. PATENT DOCUMENTS

| | | | | |
|---|---|---|---|---|
| 3,163,974 | A | * | 1/1965 | Mack ......................... 56/10.2 E |
| 3,886,718 | A | * | 6/1975 | Talbot ............................. 56/208 |
| 3,953,959 | A | * | 5/1976 | Decruyenaere ................. 56/208 |
| 4,211,057 | A | * | 7/1980 | Dougherty et al. ........ 56/10.2 E |
| 5,090,184 | A | * | 2/1992 | Garter et al. ............... 56/10.2 E |
| 5,115,628 | A | * | 5/1992 | Garter et al. ............... 56/10.2 E |
| 6,202,395 | B1 | | 3/2001 | Gramm |
| 6,289,659 | B1 | * | 9/2001 | Fox ............................ 56/10.2 E |
| 6,530,197 | B1 | * | 3/2003 | Christensen et al. ...... 56/10.2 E |
| 6,588,187 | B2 | * | 7/2003 | Engelstad et al. ......... 56/10.2 E |
| 7,222,474 | B2 | * | 5/2007 | Rayfield et al. ............ 56/10.2 E |
| 7,310,931 | B2 | | 12/2007 | Gramm |
| 7,730,700 | B2 | * | 6/2010 | Nathan et al. .............. 56/10.2 E |
| 8,146,335 | B2 | * | 4/2012 | Vandeven ................... 56/10.2 E |
| 2006/0242935 | A1 | * | 11/2006 | Rayfield et al. ............ 56/10.2 E |
| 2008/0264025 | A1 | * | 10/2008 | Ditchcreek et al. ........ 56/10.2 E |
| 2010/0077712 | A1 | * | 4/2010 | Nathan et al. .............. 56/10.2 E |
| 2011/0271653 | A1 | * | 11/2011 | Vandeven ................... 56/10.2 E |

* cited by examiner

*Primary Examiner* — Arpad Fabian-Kovacs (57) ABSTRACT

A sensor arrangement for an agricultural harvesting head comprises a sensor attached to a cutter bar in the place of a skid shoe.

13 Claims, 7 Drawing Sheets

AGRICULTURAL HARVESTING HEAD SENSOR ARRANGEMENT

FIELD OF THE INVENTION

The present invention relates to agricultural harvesting heads. More particularly it relates to height sensors for agricultural harvesting headers.

BACKGROUND OF THE INVENTION

An agricultural harvesting machine such as a combine includes a harvesting header and a feeder housing or crop elevator which removes the crop material from the field, gathers the crop material and transports the crop material to a threshing, separating and cleaning mechanism located in the combine.

The cleaned grain is deposited in a grain tank located at the top of the combine. When the grain tank becomes full, an unloading auger, which is supported on and positioned alongside of the combine during harvesting, is moved to its unloading position in which the auger extends approximately perpendicular to the longitudinal axis of the combine. A vehicle drives alongside the combine into which the grain is to be unloaded, such as a semi-trailer, and the unloading auger is actuated to discharge the grain into the vehicle.

For small stemmed crops such as wheat, soybeans, etc., the combine typically carries and drives a header with a reciprocating knife or cutter bar at the leading edge of the platform.

To insure the head harvests substantially all the crop, it is lowered until it almost touches (or just touches) the ground such that it severs the plants underneath the crop-bearing portions of the plant.

To do this, the height of the harvesting head must follow the undulations in the ground contours as the ground rises and falls under the harvesting head. Automatic header height control ("AHHC") having height sensors are used to maintain the proper spacing.

In U.S. Pat. No. 6,202,395, a header height sensor is shown having a coil spring and being disposed inside of a crop divider of a corn head. This location places the sensor ahead of the crop, but mounts it on a plastic structure that can tilt upward when the corn head impacts the ground. Further, the sensor arm is quite slender and prone to being bent or deflected sideways.

In U.S. Pat. No. 7,310,931, a header height sensor includes a sensor element located in a crop divider of a corn head with a sensor arm that extends out of a hole on the crop divider. The sensor arm is long, slender and flexible to avoid being damaged when the harvesting head is run over rough ground or lowered into contact with the ground. The greatly extended whip-like length makes the sensor arm easy to catch on objects extending from the ground and be damaged.

It is an object of this invention to provide a robust height sensor that provides more accurate readings and is less subject to damage than existing height sensors. These advantages are provided by the arrangements of each of the independent claims.

SUMMARY OF THE INVENTION

In accordance with one aspect of the invention, a sensor arrangement for sensing the height of an agricultural harvesting head with respect to the ground over which it travels while the agricultural harvesting head is harvesting crops is provided, the agricultural harvesting head having a frame that extends laterally and horizontally and generally perpendicular to a direction of travel of the agricultural harvesting head as it harvests crops, a plurality of members fixed to the frame and extending generally forward therefrom and in the direction of travel, a cutter bar that extends laterally and horizontally and generally perpendicular to the direction of travel, a plurality of skid shoes bolted to the cutter bar and extending substantially the entire width of the agricultural harvesting head, wherein the plurality of skid shoes are individually removable and replaceable, the sensor arrangement comprising a mounting bracket fixed to the cutter bar in place of at least one skid shoe; a sensor arm pivotally connected to the mounting bracket to pivot with respect thereto about an axis that extends generally parallel to the longitudinal extent of the cutter bar; and a sensor disposed to sense a position of the sensor arm with respect to the mounting bracket.

The sensor may be configured to be mounted to the cutter bar by (1) removing said at least one skid shoe and (2) fixing the mounting bracket to the cutter bar in a location evacuated by the removal of said at least one skid shoe. The mounting bracket may be fixed to the cutter bar without modifying the cutter bar. The mounting bracket may be fixed to the cutter bar using structures on the cutter bar that were also used to fix said at least one skid shoe to the cutter bar. The lateral width of the mounting bracket may be equal to the width of an integer multiple of the lateral width of one of the plurality of skid shoes. The mounting bracket may have an exposed lower surface with a contour that matches a contour of an exposed lower surface of skid shoes that are fixed to the cutter bar and adjacent to the mounting bracket. The sensor arm may be pivotally connected to the mounting bracket at a position right behind a lower rear edge of the cutter bar. The sensor may be disposed right behind a lower rear edge of the cutter bar. The sensor arm may be disposed to be undamaged when the cutter bar contacts the ground. The mounting bracket may be a plate having substantially the same geometry as the at least one skid shoe. The mounting bracket may be fixed directly to the cutter bar.

In accordance with a second aspect of the invention, an agricultural harvesting head is provided, comprising a frame that extends laterally and horizontally and generally perpendicular to a direction of travel of the agricultural harvesting head as it harvests crops; a plurality of members fixed to the frame and extending generally forward therefrom and in the direction of travel; a cutter bar that extends laterally and horizontally and generally perpendicular to the direction of travel; a plurality of skid shoes bolted to the cutter bar and extending across substantially the entire width of the agricultural harvesting head, wherein the plurality of skid shoes are individually removable and replaceable; and a sensor arrangement configured to sense the height of the agricultural harvesting head above the ground, the sensor arrangement comprising: a mounting bracket fixed to the cutter bar in place of at least one skid shoe, a sensor arm pivotally connected to the mounting bracket to pivot with respect thereto about an axis that extends generally parallel to the longitudinal extent of the cutter bar, and a sensor disposed to sense a position of the sensor arm with respect to the mounting bracket, wherein the mounting bracket is fixed to the cutter bar in place of at least one skid shoe.

In accordance with a third aspect of the invention, a method of attaching a sensor arrangement to a cutter bar of an agricultural harvesting head, comprising the steps of: removing at least one of the skid shoes from the cutter bar; fixing the sensor arrangement to the cutter bar in a location from which the at least one skid shoe was removed. The sensor arrangement may comprise a mounting bracket and a sensor arm pivotally coupled to the mounting bracket, and a sensor disposed to sense a position of the sensor arm with respect to the mounting bracket, and further wherein the step of fixing further comprises the step of fixing the mounting bracket on the cutter bar immediately adjacent to another skid shoe such that the mounting bracket has an exposed lower surface with a contour that matches a contour of an exposed lower surface of said another skid shoe. The step of fixing includes the step of fixing the mounting bracket to the cutter bar such that the contour of the mounting bracket is coplanar with the contour of said another skid shoe.

DETAILED DESCRIPTION OF THE INVENTION

Referring now to FIGS. 1, 2, 3 and 4, an agricultural harvesting head 100 is shown. Head 100 extends laterally and generally perpendicular to the direction of travel "V" that head 100 follows when harvesting crops. Head 100 has a frame 102, a plurality of members 104, a cutter bar 106, a plurality of skid shoes 108 (see FIG. 4), a sensor arrangement 110, and a plurality of conveyor belts 112, 114, 116.

Figure 1:
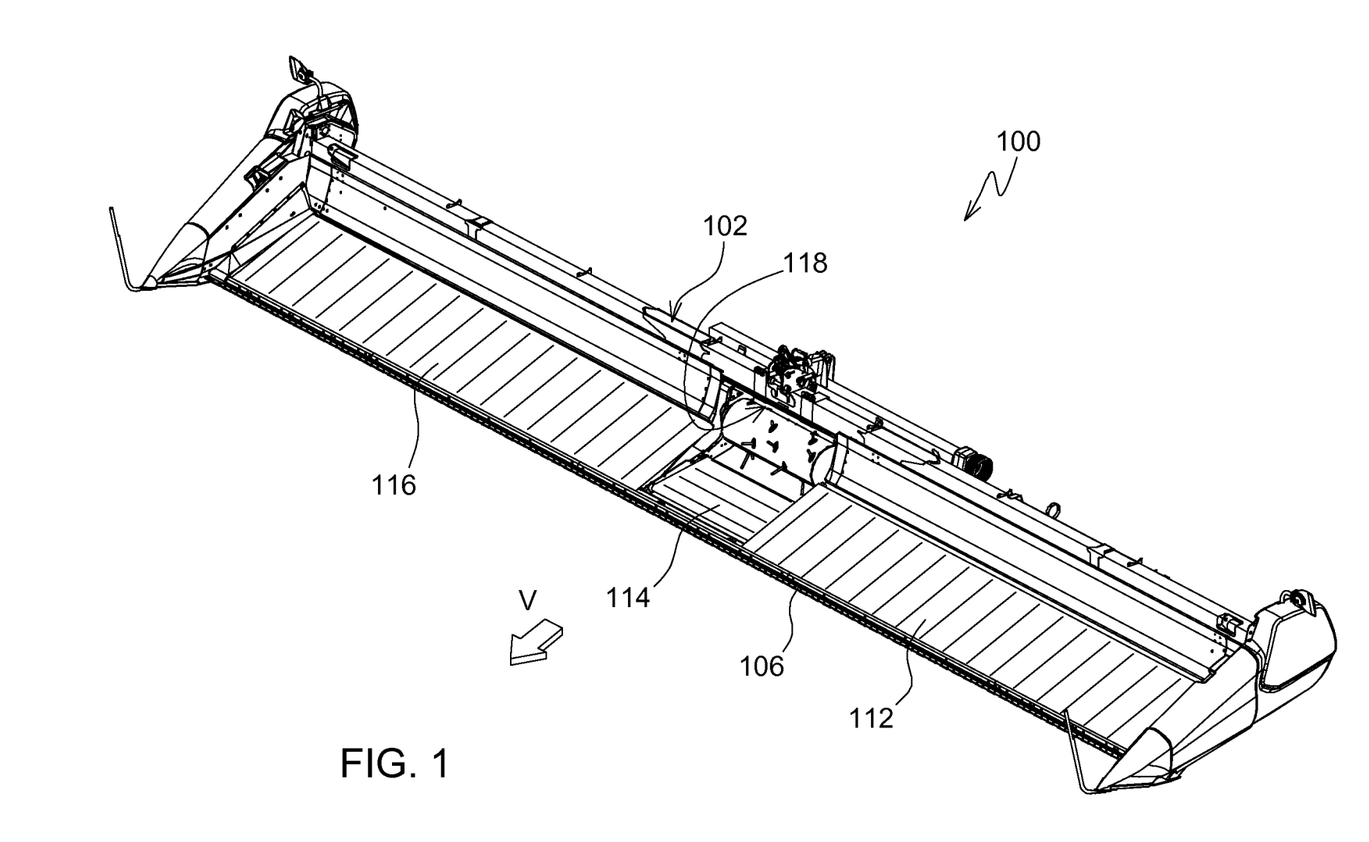
FIG. 1 is a perspective view of an agricultural harvesting head in accordance with the claimed invention.
Figure 2:
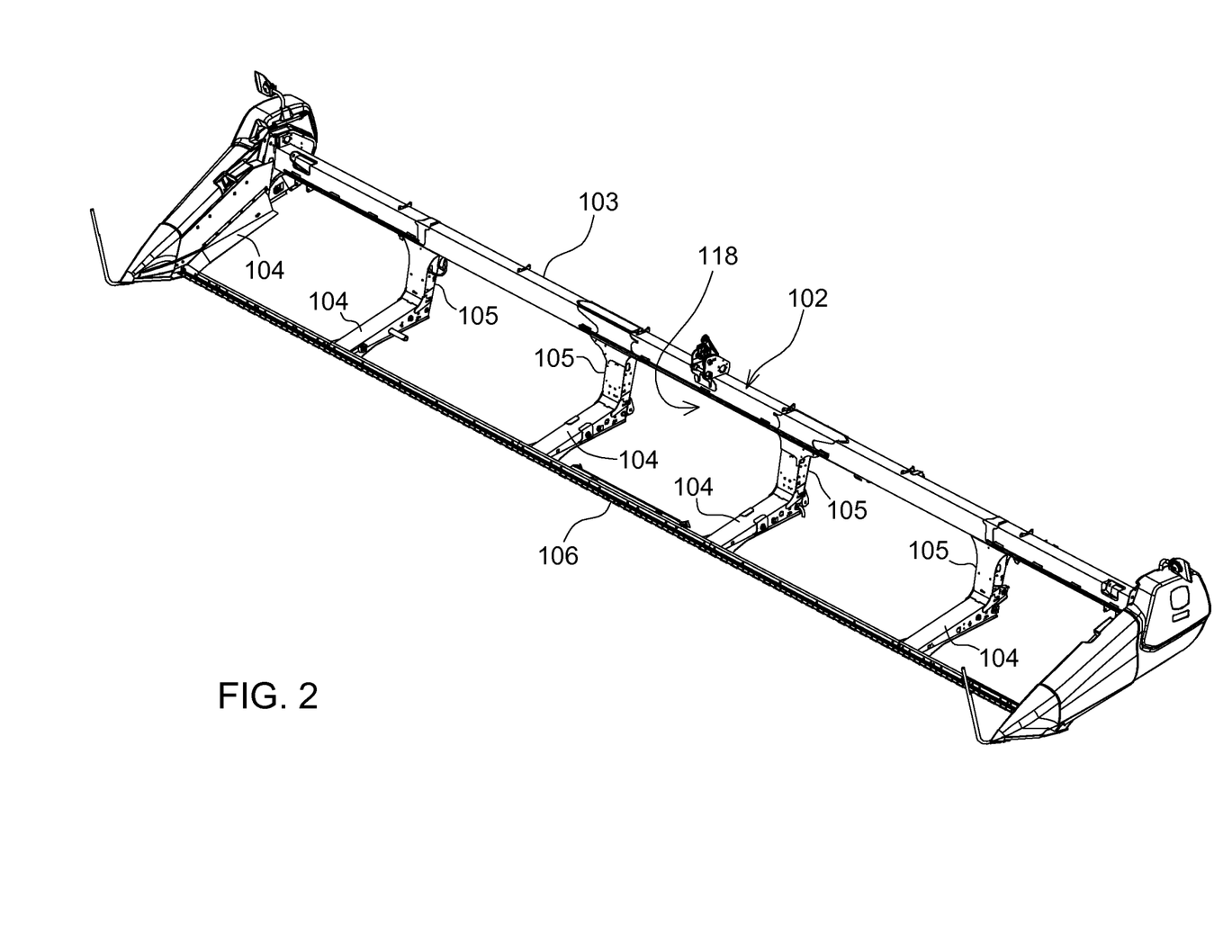
FIG. 2 is perspective view of the frame of the harvesting head of FIG. 1.
Figure 3:
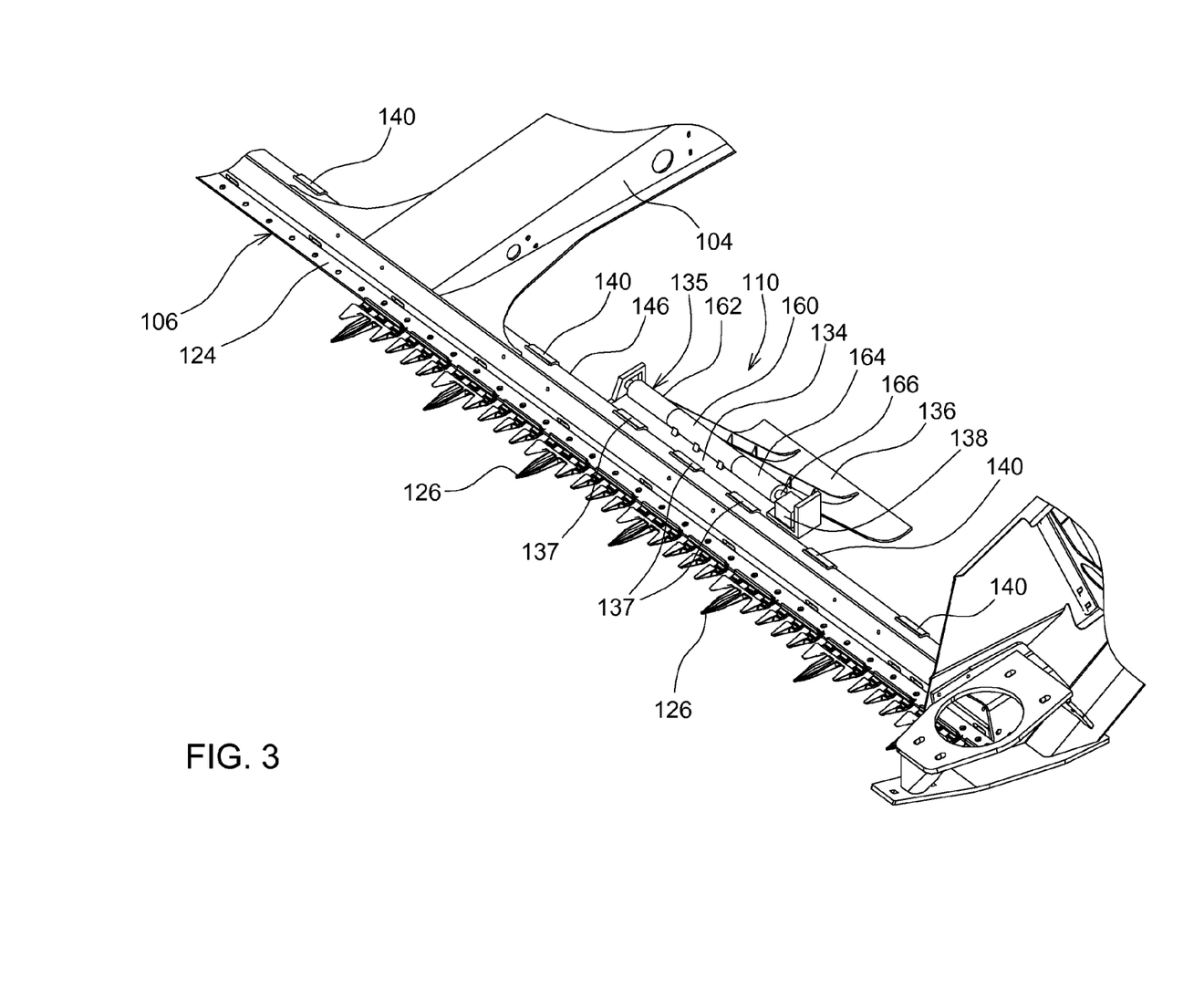
FIG. 3 is a fragmentary front perspective view of the left side of the frame of FIG. 2.
Figure 4:
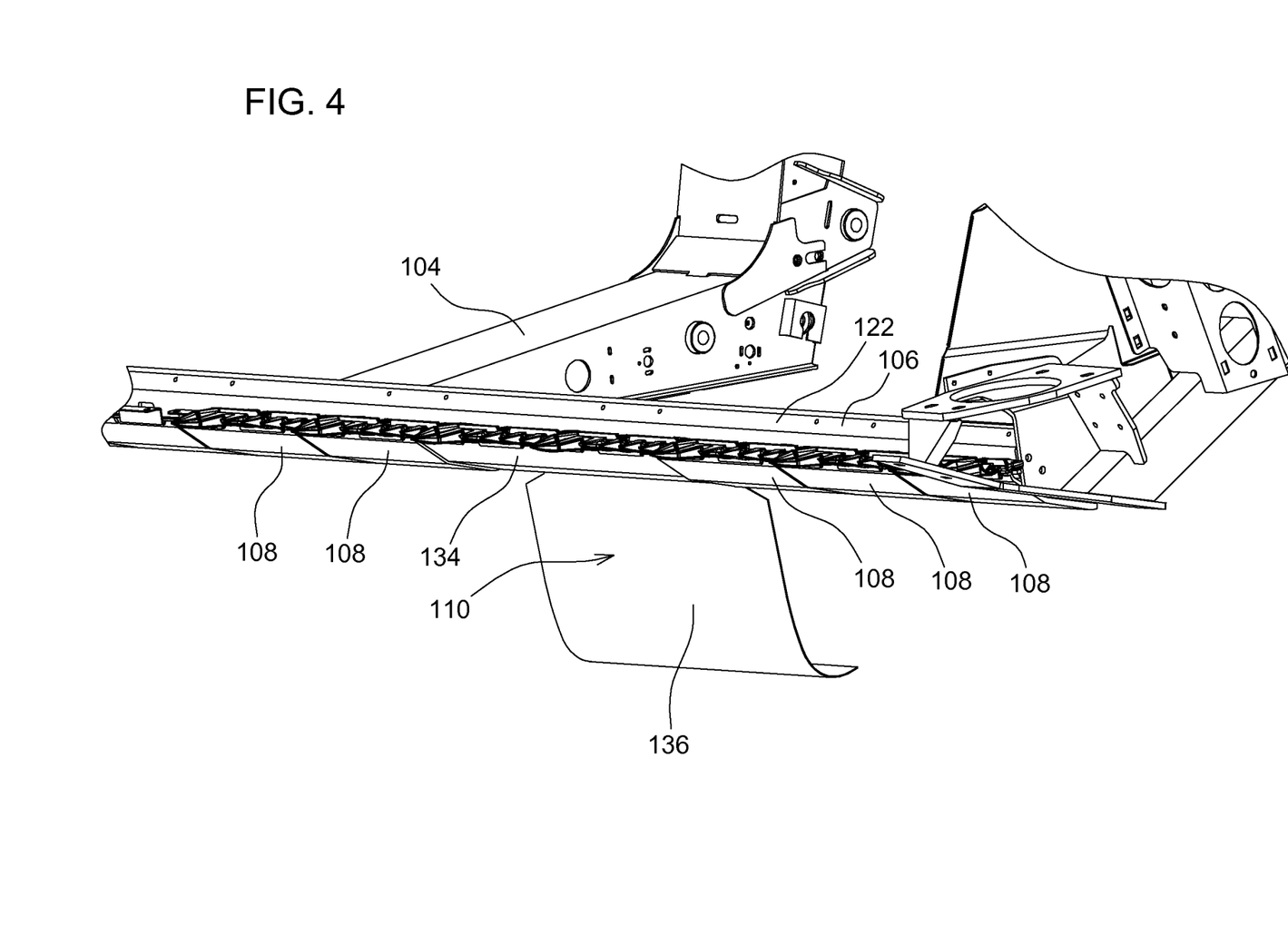
FIG. 4 is a fragmentary front perspective view of the frame of FIGS. 2-3 taken at lower angle than FIG. 3 showing details of the sensor.
Figure 5:
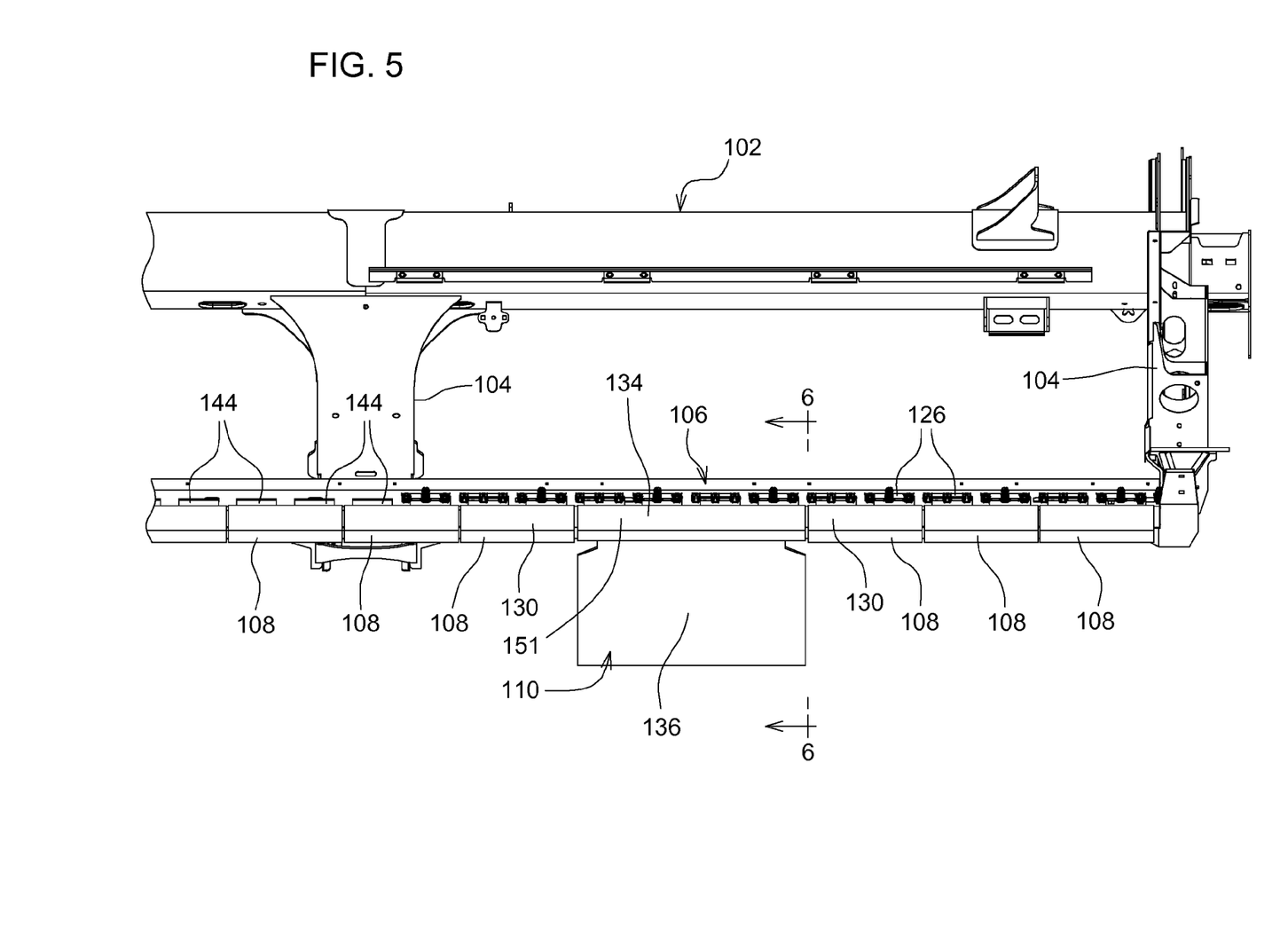
FIG. 5 is a front view of the left side of the frame of FIGS. 2-4.

Frame 102 extends laterally and perpendicular to the direction of travel "V" and in a generally horizontal orientation. Frame 102 has a central aperture 118 through which cut cop is conveyed by left side, center, and right side conveyor belts 112, 114, 116, respectively. Frame 102 extends substantially the entire width of head 100. Frame 102 comprises an elongate member 103 extending laterally across substantially the entire width of the head 100, and members 105 extend downwardly from and are fixed to elongate member 103.

The plurality of members 104 are disposed in spaced-apart locations across the width of the frame 102. Each member 104 has a rear end fixed to a lower end of a corresponding member 105 of the frame 102 and extends forwardly in a generally horizontal orientation from the corresponding member 105.

Figure 6:
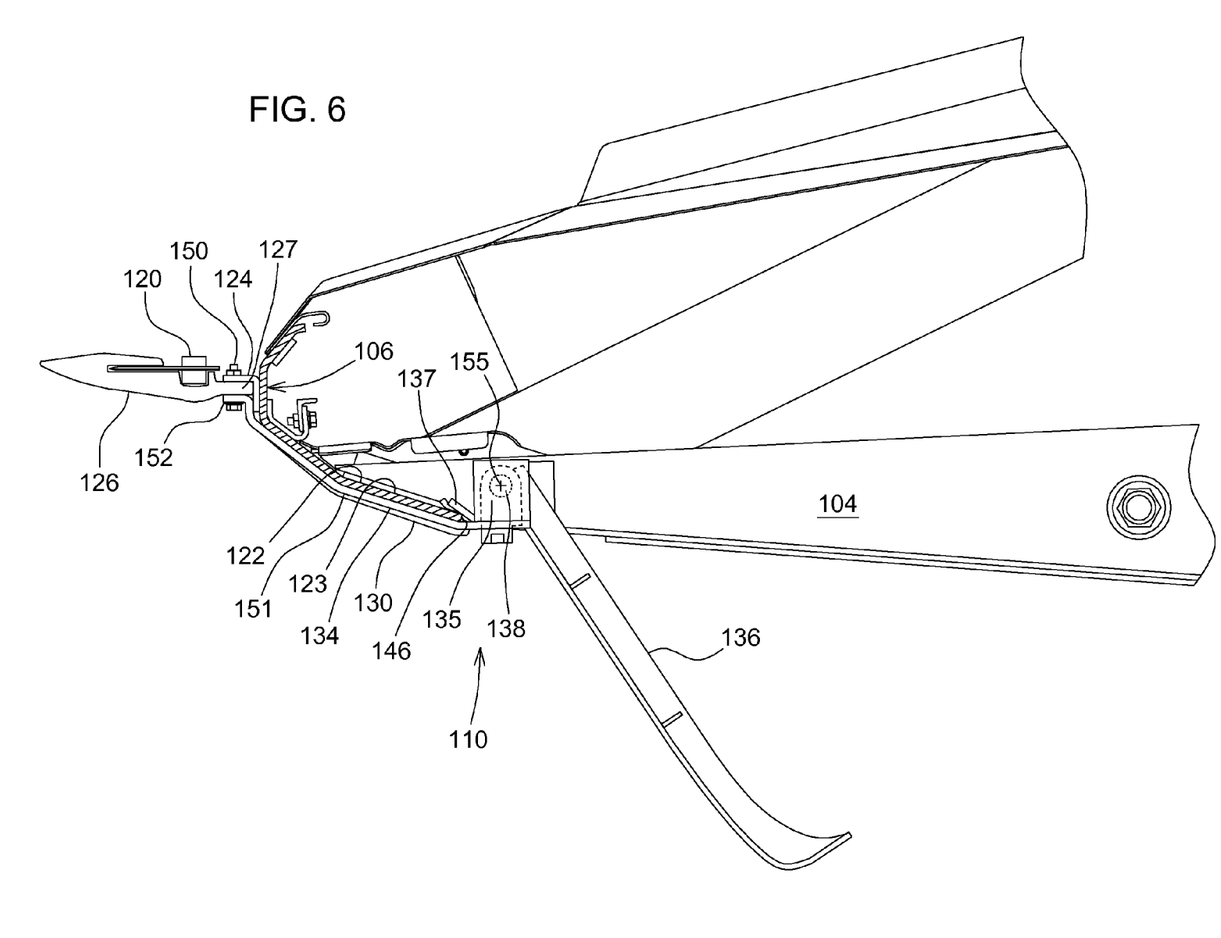
FIG. 6 is a cross-sectional view of the frame of FIGS. 2-5 taken at section line 6-6 in FIG. 5 and showing the sensor arm in its downwardly extended position.
Figure 7:
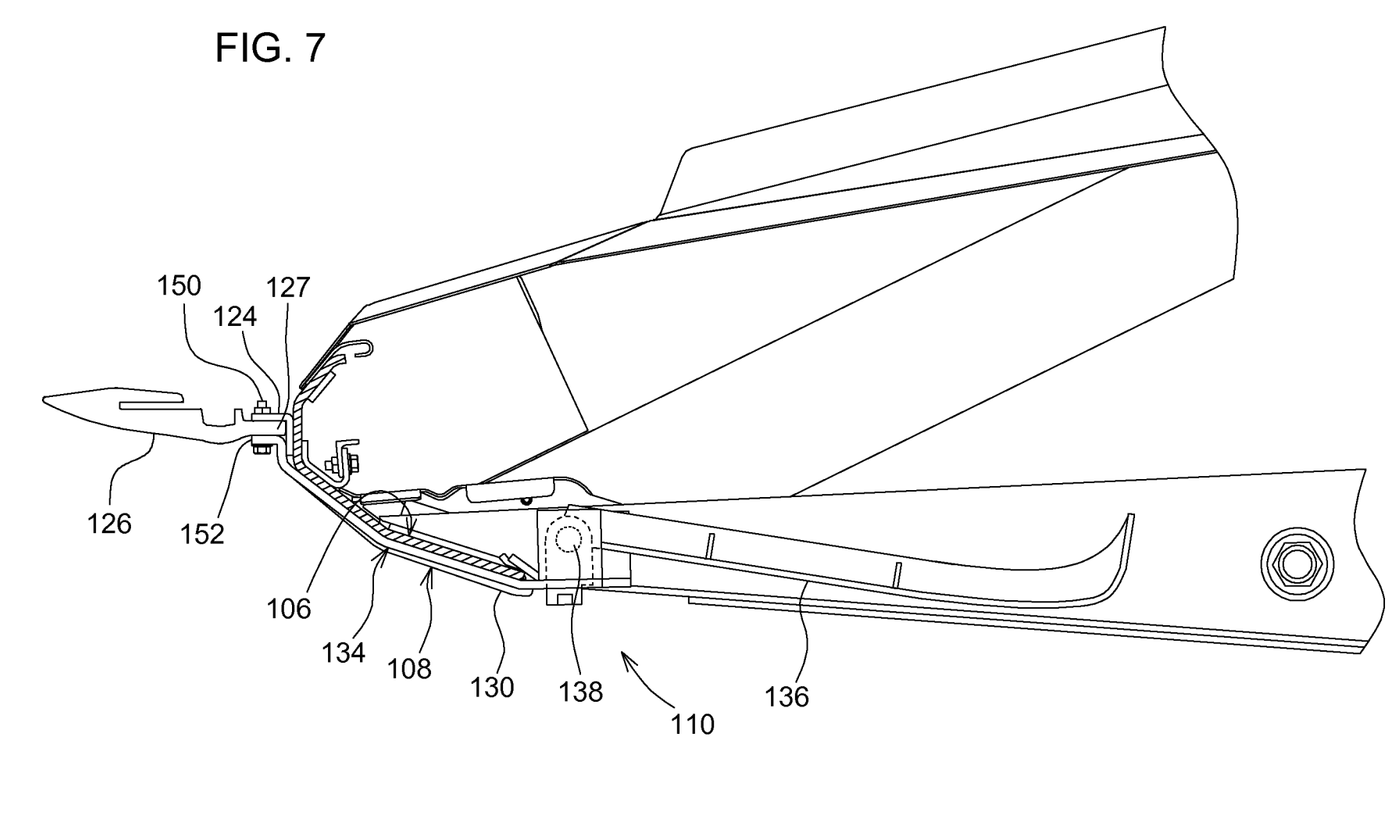
FIG. 7 is a cross-sectional view of the frame of FIGS. 2-5 taken at section line 6-6 in FIG. 5 and showing the sensor arm in its folded and stowed position.

A cutter bar 106 is fixed to the forward ends of the members 104. It is generally parallel to the frame 102, and like frame 102 extends longitudinally in a direction perpendicular to the forward direction of travel "V". The cutter bar 106 extends horizontally. The cutter bar 106 supports an elongate reciprocating knife 120 (FIGS. 6-7) that is supported for transversely reciprocating movement on a plurality of knife guides 126.

The cutter bar 106 includes an elongate member 122 fixed to the forward ends of the members 104. The knife 120, the knife guides 126 and the member 122 extend across substantially the entire width of the agricultural harvesting head 100.

In cross-section (best shown in FIGS. 6-7), the elongate member 122 comprises a rearward-opening, "C"-shaped beam 123 to which a forwardly extending flange 124 is fixed.

The plurality of skid shoes 108 are mounted against the outer and downwardly facing surface of the lower leg of the "C"-shaped beam. The plurality of skid shoes 108 are mounted in a side-by-side, closely spaced arrangement such that they extend across and cover substantially the entire bottom surface of the "C"-shaped beam 123. Their function is to protect the lower surface of the cutter bar and reduce cutter bar wear when the cutter bar inevitably contacts and skids along the ground. In a particularly preferred arrangement, most or all of the skid shoes are identical to one another. This reduces the manufacturing costs and the number of different skid shoes that must be kept in inventory.

The plurality of knife guides 126 include rear ends 127 engaged with the bottom of and bolted to the flange 124 in spaced apart arrangement over substantially its entire longitudinal extent and hold the reciprocating knife 120 in position while it reciprocates.

The skid shoes 108 are of a substantially constant thickness. The skid shoes 108 may each comprise a wear-resistant thermoplastic plate or layer. The skid shoes 108 may each comprise a plate or layer of metal, preferably steel. The skid shoes may each comprise a thermoplastic plate or layer combined with a plate or layer of metal. The plate or layer of metal may be disposed behind the thermoplastic plate or layer and in that way provide additional support and rigidity to the skid shoe 108.

Each of the skid shoes 108 preferably has outer and lower facing surfaces 130 that are identical with outer and lower facing surfaces of all or substantially all the other skid shoes 108. This arrangement defines a generally continuous bottom skidding surface extending across substantially the entire width of the head 100 that does not gouge the ground even when the head 100 is turned to the left or the right by the agricultural combine that carries the head 100 through the field.

Each of the skid shoes 108 has a trailing end portion 140 (FIG. 3) that wraps around (e.g. hooks on to) a trailing edge 146 of the "C"-shaped beam 123 of the cutter bar. This holds the rear end of the skid shoes 108 to the cutter bar 106. Front end tabs 144 of each skid shoe 108 extend substantially the entire transverse width of the skid shoe 108 and just underneath the rear ends 127 of associated ones of the knife guides 126, which rear ends, in turn, are just underneath the flange 124. Fasteners 150 extend through corresponding holes in flange 124, in the rear ends 127 of the knife guides 126 and front tabs 144 of each skid shoe 108 and when tightened secure the front ends of the skid shoe 108 and the rear ends of the knife guides 126 to the underside of flange 124. These holes through flange 124 are spaced apart in a repeating pattern across substantially the entire length of the flange 124 such that skid shoes can be located at any location. In the preferred embodiment, each skid shoe is provided with one or two of the tabs 144 for securing each skid shoe 108 to the underside of flange 124.

The sensor arrangement 110 is fixed to the cutter bar 106 to provide a signal indicative of the height of the head 100 to an automatic header height control circuit ("AHHC"—not shown). The AHHC includes a digital microprocessor that continuously receives the signal from the sensor arrangement 110, compares it to a desired height (i.e. reference height), and either raises or lowers the head 100 on the agricultural combine (not shown) to move the head 100 to the desired height.

In the most common arrangement, the AHHC controls the flow of hydraulic fluid to and from hydraulic cylinders that raise and lower the feederhouse disposed on the front of the combine. The head 100 is supported on the feederhouse, and thus when the feederhouse raises or lowers with respect to the ground, the head 100 raises and lowers as well.

The sensor arrangement 110 is mounted on the cutter bar 106 in place of one or more skid shoes 108. The sensor arrangement has an outer and lower facing surface 151 that is substantially identical with the surface 130 of at least one (and preferably both) of the adjacent skid shoes. In this manner, the head 100 can be turned to the right or left without the sensor arrangement digging into the ground.

In the preferred embodiment shown herein, the sensor arrangement 110 is mounted to the cutter bar 106 in a location that could otherwise be occupied by two adjacent skid shoes 108. The sensor arrangement 110 can be scaled down in a lateral or transverse direction, parallel to the longitudinal extent of the cutter bar 106 by one half, in order to take the space of a single skid shoe 108. It could be scaled up in the same lateral direction to take the place of three, four, or even more skid shoes 108. Regardless of the ultimate width it is most preferable that the sensor arrangement take the place of and be as wide as an integer multiple of skid shoes.

The sensor arrangement 110 is preferably configured to mount to the cutter bar 106 at a plurality of locations with few (and preferably, no) modifications to the cutter bar 106 and sensor arrangement 110 other than the removal of the threaded fasteners 150 that attach the selected skid shoes 108 to the cutter bar, the removal of the selected skid shoes 108, the insertion of the sensor arrangement 110 in place of the selected (and now removed) skid shoes 108, and the attachment of threaded fasteners 150 to hold the sensor arrangement 110 in place.

Referring to FIGS. 3, 4, 5, 6 and 7, the sensor arrangement 110 is comprised of three primary elements: a mounting bracket 134, a sensor arm 136 and a sensor 138. Mounting bracket 134 has a trailing end portions 137 that wraps around the trailing edge 146 of the cutter bar 106. It has a leading end portion 152 with holes that align with the corresponding holes in flange 124 by which the skid shoes 108 are attached. Threaded fasteners 150 that hold the skid shoes 108 in place can be reused to hold the sensor arrangement 110 in place.

The outer- and downward-facing bottom surface 151 of the mounting bracket 134 is contoured like the outer- and downward-facing surface 130 of at least one and preferably both adjacent skid shoes 108: the surfaces are preferably generally coplanar.

By reusing the same mounting structures on the cutter bar for attaching both the skid shoes 108 and the sensor arrangement 110, the operator can add or remove the sensor arrangement 110 to the cutter bar without additional machining. Further, the operator can move the sensor arrangement 110 to different locations along the length of the cutter bar 106.

The sensor arm 136 is pivotally connected to the mounting bracket 134 to pivot with respect to the mounting bracket about an axis 155 that is generally horizontal and extends parallel to the longitudinal extent of the cutter bar 106. A hinge 135 includes a central tube section 160 fixed to an upper rear end location of the bracket 134 and positioned between right and left tube sections 162, 164 respectively fixed to right and left rear end locations of the sensor arm 136, with a pin 166 extending through all of the tube sections, thereby coupling the mounting bracket 134 to the sensor arm 136. The hinge 135 is located slightly above and behind the trailing edge 146 of the cutter bar 106 such that when the sensor arm 136 is pivoted upward, the hinge 135 is above and behind the trailing edge 146 of the cutter bar. This arrangement limits damage to the sensor arm 136 when the head 100 inadvertently makes contact with the ground. Because the mounting bracket 134 of the height sensor has a plurality of planar skidding surfaces on the bottom that are generally coplanar with respective planar skidding surfaces of each of the skid shoes, and since the sensor arm can fold up behind the skid shoes and cutter bar, the risk of damage is significantly reduced.

Having described the preferred embodiments, it will become apparent that various modifications can be made without departing from the scope of the invention as defined in the accompanying claims.

The invention claimed is:

1. A combined agricultural harvesting head and sensor arrangement for sensing the height of the agricultural harvesting head with respect to the ground over which it travels while the agricultural harvesting head is harvesting crops, the agricultural harvesting head having a frame that extends laterally and horizontally and generally perpendicular to a direction of travel of the agricultural harvesting head as it harvests crops, the frame including a plurality of members extending generally forward in the direction of travel, a cutter bar that extends laterally and horizontally and generally perpendicular to the direction of travel being fixed to forward ends of the plurality of members and including a forwardly projecting flange, a plurality of mounting holes provided in said flange of the cutter bar in a number of repeating hole patterns extending substantially an entire length of the flange respectively provided for the mounting of a like number of skid shoes, a plurality of skid shoes of a number at least one less than said number of repeating hole patterns being bolted to the cutter bar respectively using all but at least one of said number of repeating hole patterns, with the plurality of skid shoes extending substantially the entire width of the agricultural harvesting head, and the sensor arrangement comprising:

a mounting bracket bolted to the flange of the cutter bar using said at least one of said repeating hole patterns of the mounting holes provided for the mounting of at least one skid shoe in addition to said plurality of skid shoes;

a sensor arm pivotally connected to the mounting bracket to pivot with respect thereto about an axis that extends generally parallel to the longitudinal extent of the cutter bar; and a sensor disposed to sense a position of the sensor arm with respect to the mounting bracket.

2. The combined agricultural harvester header and sensor arrangement of claim 1, wherein the sensor is disposed adjacent said axis and is configured to sense the position of the sensor arm with respect to the mounting bracket.

3. The combined agricultural harvester header and sensor arrangement of claim 1, wherein the mounting bracket is fixed to the cutter bar without modifying the cutter bar.

4. The combined agricultural harvester header and sensor arrangement of claim 1, wherein each of the skid shoes and the mounting bracket include respective leading end portions fixed to the flange of the cutter bar using bolts inserted through respective ones of the repeating hole patterns in the cutter bar.

5. The combined agricultural harvester header and sensor arrangement of claim 1, wherein the mounting bracket has a lateral width equal to the width of an integer multiple of the lateral width of one of the plurality of skid shoes.

6. The combined agricultural harvester header and sensor arrangement of claim 1, wherein the mounting bracket has an exposed lower surface with a contour that matches a contour of an exposed lower surface of skid shoes that are fixed to the cutter bar and adjacent to the mounting bracket.

7. The combined agricultural harvester header and sensor arrangement of claim 1, wherein the mounting bracket has an exposed lower surface with a contour that matches a contour of an exposed lower surface of each of the plurality of skid shoes.

8. The combined agricultural harvester header and sensor arrangement of claim 1, wherein the cutter bar has a bottom surface which extends down and to the rear from said flange and wherein the sensor arm is pivotally connected to the mounting bracket at a position immediately behind a lower rear edge of the bottom surface of the cutter bar.

9. The combined agricultural harvester header and sensor arrangement of claim 8, wherein the sensor is disposed adjacent the pivotal connection of the sensor arm with the mounting bracket.

10. The combined agricultural harvester header and sensor arrangement of claim 1, wherein the sensor arm is disposed in trailing relationship to the mounting bracket and cutter bar so as to be undamaged when the cutter bar contacts the ground.

11. The combined agricultural harvester header and sensor arrangement of claim 1, wherein the at least one skid shoe and the mounting bracket are each in the form of a plate, with each plate having substantially the same geometry.

12. The combined agricultural harvester header and sensor arrangement of claim 1, wherein the cutter bar has a bottom surface which extends down and to the rear from said flange and wherein the mounting bracket is in the form of a plate having a portion shaped complimentary to and engaging the bottom surface of the cutter bar and having a trailing end portion that is fixed directly to a rear end region of the cutter bar.

13. An agricultural harvesting head comprising:
a frame extending laterally and horizontally and generally perpendicular to a direction of travel of the agricultural harvesting head as it harvests crops;
said frame including a plurality of transversely spaced members extending generally forward therefrom and in the direction of travel;
a cutter bar extending laterally and horizontally and generally perpendicular to the direction of travel and being fixed to forward ends of said plurality of transversely spaced members;
said cutter bar including a forwardly extending flange provided with a plurality of mounting holes provided in a predetermined number of repeating hole patterns across substantially the entire width of the harvesting head;
a plurality of skid shoes being in number at least one less than said predetermined number of repeating hole patterns and being respectively bolted to the cutter bar using all but at least one of said predetermined number of repeating bolt patterns and extending across substantially the entire width of the agricultural harvesting head, wherein the plurality of skid shoes are individually removable and replaceable; and
sensor arrangement configured to sense the height of the agricultural harvesting head above the ground, the sensor arrangement comprising:
a mounting bracket releasably bolted to the flange of the cutter bar using said at least one of said predetermined number of repeating bolt patterns,
a sensor arm pivotally connected to the mounting bracket to pivot with respect thereto about an axis that extends generally parallel to the longitudinal extent of the cutter bar, and
a sensor associated with said sensor arm and configured to sense a position of the sensor arm with respect to the mounting bracket,
whereby the mounting bracket is fixed to the cutter bar in a place adapted for accommodating at least one skid shoe.

* * * * *